March 27, 1951 C. SNYDER 2,546,173
PLANETARY UNIT
Filed Oct. 15, 1946 2 Sheets-Sheet 1

INVENTOR.
Charles Snyder,
BY Victor J. Evans & Co.
ATTORNEYS

March 27, 1951 C. SNYDER 2,546,173
PLANETARY UNIT
Filed Oct. 15, 1946 2 Sheets-Sheet 2
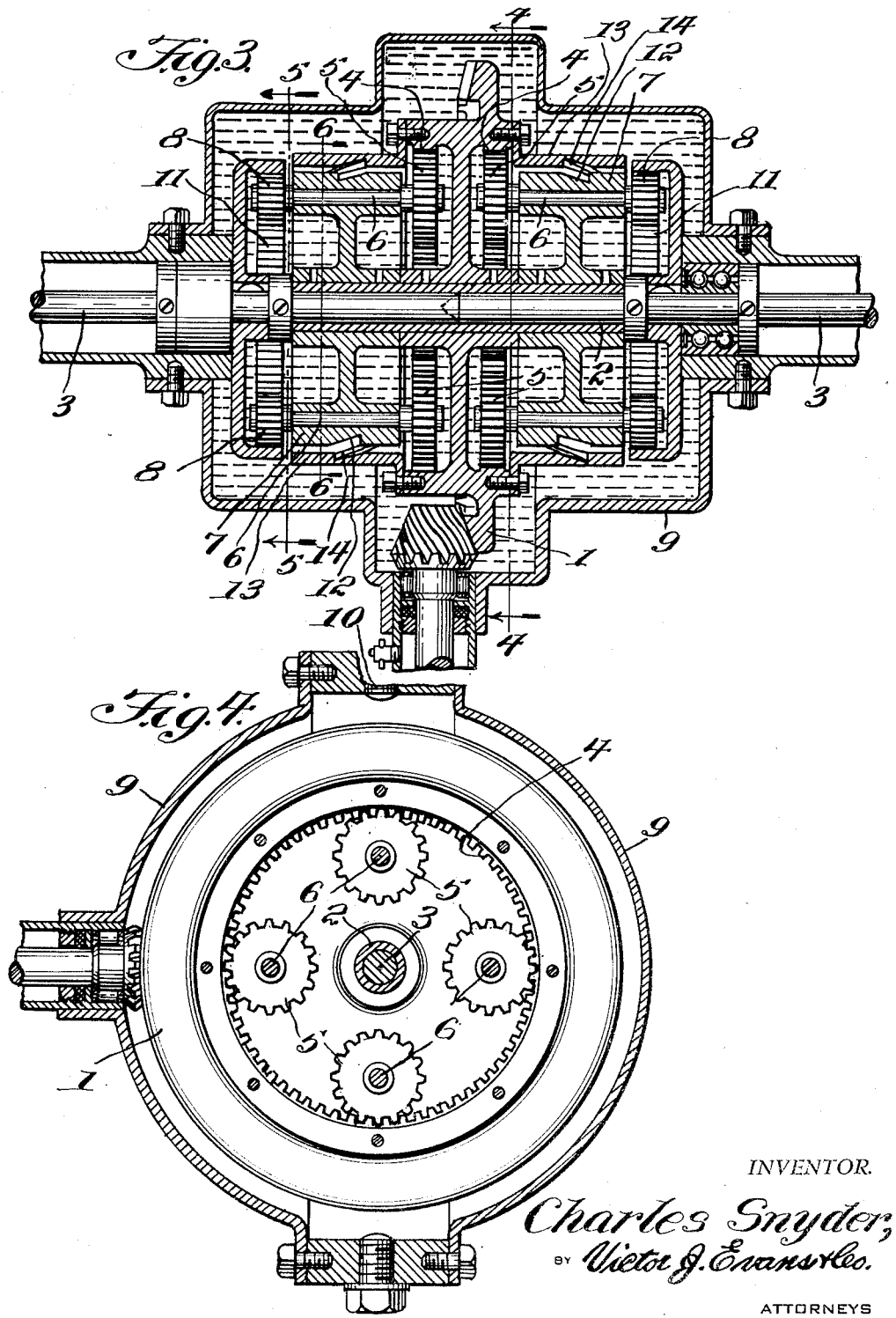
INVENTOR.
Charles Snyder,
BY Victor J. Evans & Co.
ATTORNEYS Patented Mar. 27, 1951

2,546,173

UNITED STATES PATENT OFFICE 2,546,173

PLANETARY UNIT

Charles Snyder, East Orange, N. J.

Application October 15, 1946, Serial No. 703,308

4 Claims. (Cl. 74—711)

This invention relates to transmission devices for motor vehicles, and more particularly to improvements in fluid transmission devices for use in the rear of a vehicle.

It is an object of the invention to provide a rear axle unit by means of which a great many different speeds can be attained.

A further object is the provision of a fluid drive rear axle transmission unit which has the same construction on each side, so that if one side should break down the other side will work just as well.

A further object is to provide a fluid transmission device for the rear axle unit of an automobile, which device is relatively simple in structure, and easily adapted for use on various types of automobiles.

These and other objects are attained by the novel construction and arrangement of parts hereinafter described and illustrated by the accompanying drawings, forming a part hereof, and in which:

Fig. 2 is a view taken on the line 2—2 of Fig. 1.

Fig. 3 is a sectional view taken on the line 3—3 of Fig. 2.

Figure 5:
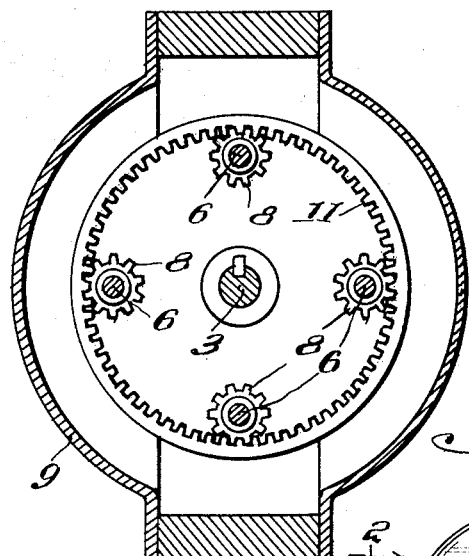
Fig. 5 is a sectional view taken on the line 5—5 of Fig. 3.
Figure 7:
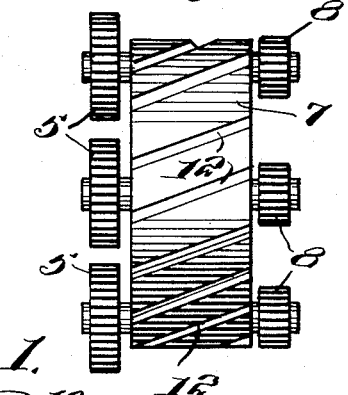
Fig. 7 is a side view of a grooved drum and gears used in the device.
Figure 1:
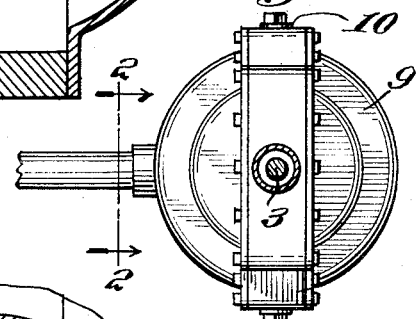
Fig. 1 is a side view of the device embodying the invention.
Figure 8:
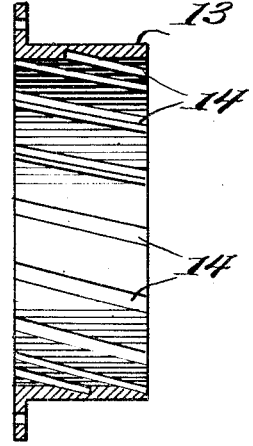
Fig. 8 is an internal view of a grooved shield adapted to cooperate with the drum.
Figure 6:
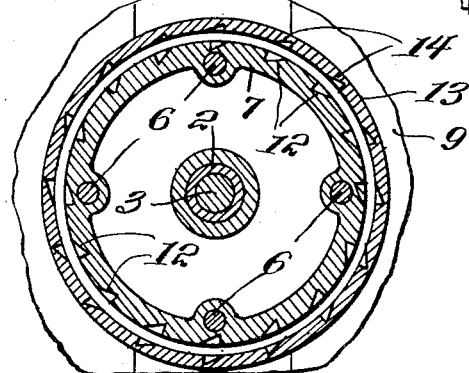
Fig. 6 is a sectional view taken on the line 6—6 of Fig. 7.

Referring to the drawings, the device is shown to comprise a ring gear 1 which is in mesh with the cone gear of a common type of automobile drive shaft. The ring gear 1 is mounted for free rotation on a tubular shaft 2, which is mounted on the driven shafts 3. The ring gear 1 has two internal gears 4 which mesh with gears 5, attached to countershafts 6, passing through drums 7 and having fixed thereto small gears 8.

Figure 4:
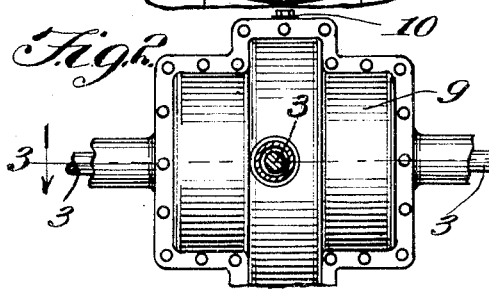
Fig. 4 is a sectional view taken on the line 4—4 of Fig. 3.

The structure above described is enclosed in a casing 9 to which oil is introduced through an opening 10. (See Fig. 4.)

The small gears 8 are in mesh with an internal gear 11 which is keyed to the shaft 3.

It is to be understood that both sides of the device are of the same structure, and consequently, it is believed necessary to describe only one side in detail.

The drum 7 is freely rotatable on the shaft 2 and has a plurality of grooves 12 cut into its surface and pitching one way. A shield 13 surrounds the drum 7 with a small clearance approximately of the order of $\frac{1}{32}''$ and is provided with a plurality of grooves 14 pitching in an opposite direction. Thus as the rotation of ring gear 1 increases oil is carried through the grooves causing the drum 7 and shield 13 to exert a drag on each other and propel evenly with the ring gear 1 as one unit, in forward direction, in high gear, until the resistance from the driven members slows up drum 7, causing less speed to the driven members. The shield 13 is connected to the ring gear 1. As the resistance becomes less, the drum 7 will catch up with the ring gear, which is driven by the engine shaft and rotates in a body.

The shield 13 and the drum 7 control all different speeds and torques. The small clearance between shield 13 and drum 7, and the lubricant acting between them causes a frictional drag between the two tending to cause them to rotate together.

It will be seen that there has been presented a rear axle transmission unit using a fluid medium which enables a great many speeds depending upon the grade and condition of the road, the unit being able to deliver a thousand to one ratio from zero up.

The above description is to be considered as illustrative and not limitative of the invention of which modifications can be made without departing from the spirit and scope of the invention as set forth in the appended claims.

The invention having been described, what is claimed is:

1. In a transmission device, a casing containing a fluid, a ring gear having an internal gear, a plurality of gears engaging the internal gear, counter shafts to which said gears are attached, a cylindrical drum through which the countershafts pass, a shaft upon which the ring gear and drum are rotatably mounted, smaller gears attached to the countershafts, a driven shaft, a second internal gear keyed to the driven shaft and in mesh with the smaller gears, and a cylindrical shield fixed to the ring, said shield extending coextensive with and encircling the drum, said drum and shield being concentric with each other and having oppositely directed grooves, whereby the fluid engaging said grooves will cause the shield and drum to exert a drag on each other to rotate the same with the ring gear.

2. In a transmission device, a casing containing a fluid, a ring gear having an internal gear, a plurality of gears engaging the internal gear, countershafts fixed to said gears, smaller gears attached oppositely to the same on said countershafts, a cylindrical drum through which the countershaft passes, a tubular shaft upon which the ring gear and drum are rotatably mounted, a second internal gear, a driven shaft to which said second internal gear is keyed, said smaller gears in mesh with the second internal gear, and a cylindrical shield concentrically encircling the drum and extending coextensively therewith, said shield being fixed to the ring gear, said shield and drum having a plurality of grooves, whereby the fluid engaging said grooves will cause the shield drum and ring gear to rotate as a unit.

3. In a transmission device, a ring gear having an internal gear and a shield attached thereto, a plurality of gears engaging the internal gear, countershafts to which said gears are attached, a cylindrical drum through which the countershafts pass, said drum and shield having concentric surfaces, respectively, provided with grooves oppositely directed, and a shaft upon which the ring gear and drum are rotatably mounted, said shield being spaced from and encircling the drum to allow a lubricant to enter the grooves and produce a drag between the shield and drum.

4. In a transmission device, a ring gear having an internal gear and a shield attached thereto, a plurality of gears engaging the internal gear, countershafts fixed to said gears, a cylindrical drum through which the countershafts pass, said drum and shield having concentric surfaces respectively provided with grooves oppositely directed, a driven shaft and the internal gear keyed to the shaft, means carried by the drum and engaging the ring gear and the internal gear to rotate the same and a shaft upon which the ring gear and drum are rotatably mounted, said shield being spaced from and encircling the drum to allow a lubricant to enter the grooves and produce a drag between the shield and the drum.

CHARLES SNYDER.

REFERENCES CITED

The following references are of record in the file of this patent:

UNITED STATES PATENTS

| Number | Name | Date |
|---|---|---|
| 1,466,320 | West | Aug. 28, 1923 |
| 1,479,752 | Smith | Jan. 1, 1924 |
| 1,533,327 | Morrissey | Apr. 4, 1925 |
| 1,646,020 | Fottinger | Oct. 18, 1927 |
| 1,659,833 | Norrlin | Feb. 21, 1928 |
| 2,253,001 | Webb et al. | Aug. 19, 1941 |